United States Patent

Surauer et al.

[11] Patent Number: 5,996,941
[45] Date of Patent: Dec. 7, 1999

[54] METHOD FOR CONTROLLING THE ATTITUDE OF A THREE-AXIS STABILIZED, EARTH ORIENTED BIAS MOMENTUM SPACECRAFT

[75] Inventors: Michael Surauer, Chieming; Walter Fichter; Peter Zentgraf, both of Munich, all of Germany

[73] Assignee: Daimler-Benz Aerospace AG, Germany

[21] Appl. No.: 08/877,467

[22] Filed: Jun. 17, 1997

Related U.S. Application Data

[63] Continuation of application No. 08/695,603, Aug. 12, 1996, abandoned.

[30] Foreign Application Priority Data

Aug. 11, 1995 [EP] European Pat. Off. ............ 95112723

[51] Int. Cl.$^6$ .................................................. B64G 1/28
[52] U.S. Cl. ............................................. 244/165; 701/13
[58] Field of Search ............................ 244/158 R, 164, 244/165; 701/13

[56] References Cited

U.S. PATENT DOCUMENTS

| | | | |
|---|---|---|---|
| 5,058,835 | 10/1991 | Goodzeit et al. | 244/165 |
| 5,308,024 | 5/1994 | Stetson, Jr. | 244/165 |
| 5,452,869 | 9/1995 | Basuthakur et al. | 244/165 |
| 5,608,634 | 3/1997 | Goodzeit et al. | 244/165 |
| 5,613,820 | 3/1997 | Shankar et al. | 244/165 |

*Primary Examiner*—Galen L. Barefoot
*Attorney, Agent, or Firm*—Evenson, McKeown, Edwards & Lenahan, P.L.L.C.

[57] ABSTRACT

An attitude controller for a 3-axis stabilized, Earth oriented bias momentum spacecraft is described, where only 2-axis attitude measurements from the Earth sensor are available. In contrast to the classical spacecrafts that are controlled w.r.t. a fixed orbital Earth pointing reference frame, (possibly large angle) time varying reference signals are considered here, i.e. the control task consists of a tracking problem. The controller design consists of a decoupling controller and axis-related PID controllers based on yaw observer estimates.

3 Claims, 5 Drawing Sheets

METHOD FOR CONTROLLING THE ATTITUDE OF A THREE-AXIS STABILIZED, EARTH ORIENTED BIAS MOMENTUM SPACECRAFT

This application is a continuation of application Ser. No. 08/695,603, filed Aug. 12, 1996, now abandoned.

The invention is related to a method and apparatus for controlling the attitude of a three-axis stabilized, earth oriented bias momentum spacecraft.

BACKGROUND AND SUMMARY OF THE INVENTION

Earth oriented three axis stabilized satellites have generally no continuous yaw attitude information available or even no yaw measurement at all. This is true especially for commercial communication satellites which have to be designed under stringent economic conditions. The common approach to achieve 3-axis stabilization with a 2-axis attitude sensor only (Earth sensor) is to establish a bias momentum perpendicular to the orbit plane which leads to observability of the yaw motion by the roll measurement. An early publication in this field is e.g. [DoSR68], which is well-known as the "Whecon"-principle.

Figure 1:
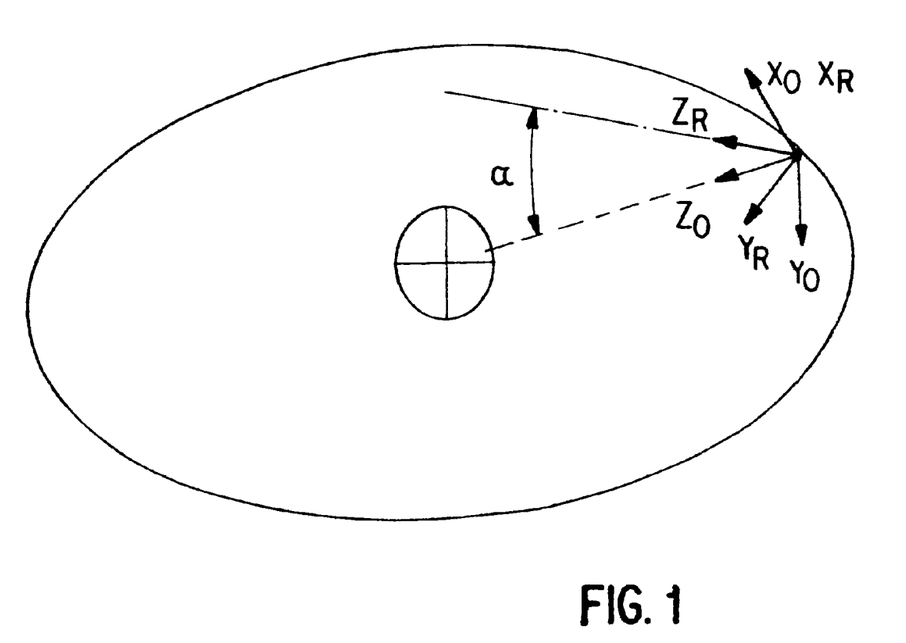
FIG. 1 is a schematic representation of a spacecraft orbit and reference system used for explaining the control method according to the invention.
Figure 2:
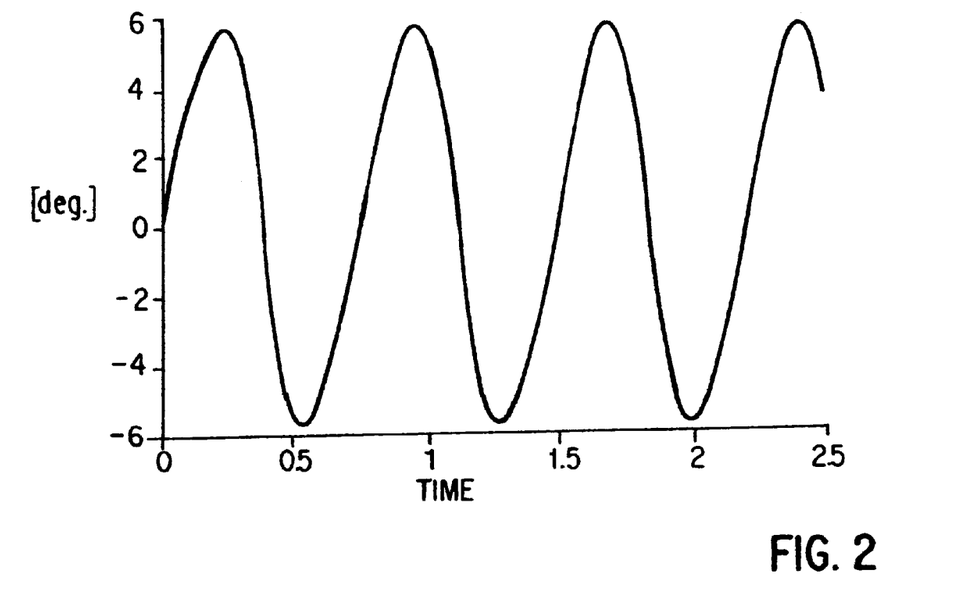
FIG. 2 is a graphic depiction of a roll reference $\alpha$ and the controlled roll attitude $\phi$.
Figure 3:
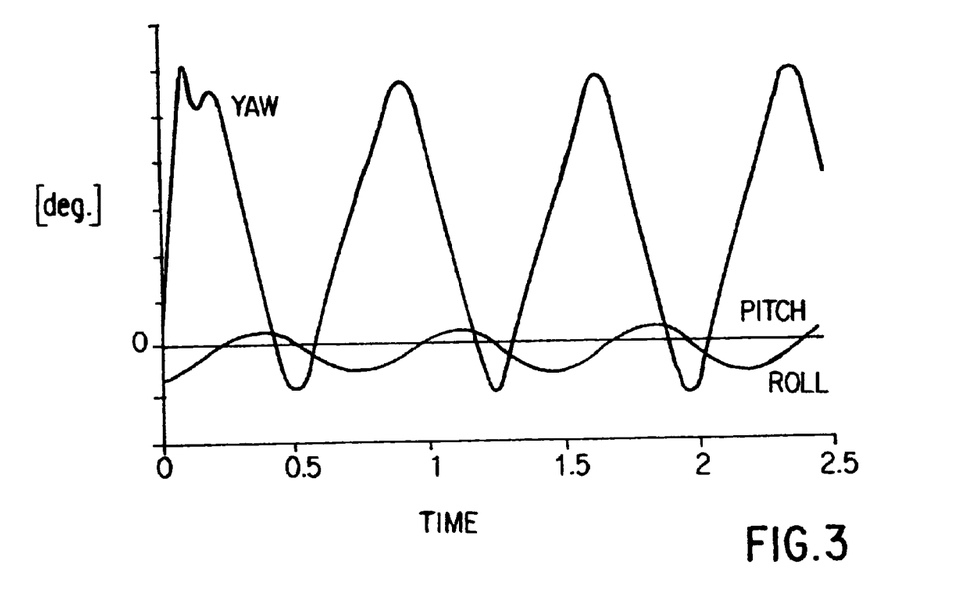
FIG. 3 is a graphic depiction of the time variation of attitude control errors in roll, pitch and yaw.
Figure 4:
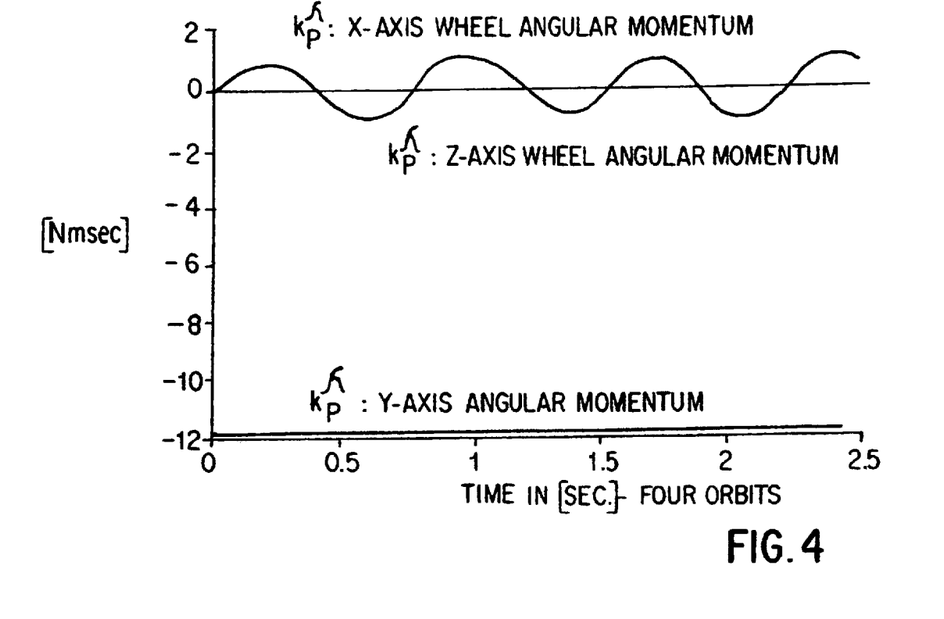
FIG. 4 shows wheel angular momentum as a function of time during a roll tracking maneuver.

The invention provides a control design approach for a generalized Earth pointing control mode with 2-axis Earth sensor measurements only and bias momentum coupling, where time varying attitude reference signals with respect to an Earth pointing reference frame are considered. This means, the control method according to the invention addresses a tracking problem in addition to a disturbance rejection problem. A possible control task is shown in FIG. 1. The desired spacecraft attitude, here a roll-bias angle $\alpha$ and zero pitch- and yaw angles, can be expressed as a time varying reference attitude with respect to the orbital Earth pointing reference frame $(x_a y_a z_o)$. Furthermore, roll-tracking is necessary in case of inclined orbit operations of geosynchronous satellites, where proper Earth orientation for antenna pointing purposes has to be maintained.

Another example is small satellites in low Earth orbits, that use—besides the solar array rotation—one degree of freedom around the satellite yaw axis for the optimal orientation of the solar panels, i.e. to assure that the sun vector is always (nearly) perpendicular to the panel surface.

The subsequent explanations cover as far as possible a general case. Examples are given for the above mentioned application of roll tracking operations.

The minimum sensor and actuator hardware configuration which is necessary for the realization of this attitude control approach consists of the following components:

a.) A set of wheels that span the 3-dimensional space, i.e. practically linear actuators which produce torques around the 3 spacecraft axes. Usually 4 wheels are used for redundancy.

b.) An Earth sensor that delivers a 2-axis attitude information around the roll- and pitch axis.

Additionally, an actual spacecraft has to be equipped with actuators for angular momentum control, such as magnetic torquers, thrusters, and/or solar array drives for solar torque compensation, depending on the spacecraft mission.

DETAILED DESCRIPTION OF THE DRAWINGS

Spacecraft Dynamics and Kinematics

Transformations between Involved Coordinate Systems

Transformation from orbit system to reference system. The spacecraft is rotated from the orbit system by time-varying bias Euler-angles $\gamma(t)$ about the yaw-axis, $\beta(t)$ about the pitch-axis and $\alpha(t)$ about the roll-axis with corresponding transformation matrices $T_\alpha$, $T_\beta$, $T_\gamma$:

$$T_\alpha = \begin{bmatrix} 1 & 0 & 0 \\ 0 & c\alpha & s\alpha \\ 0 & -s\alpha & c\alpha \end{bmatrix}; T_\beta = \begin{bmatrix} c\beta & 0 & -s\beta \\ 0 & 1 & 0 \\ s\beta & 0 & c\beta \end{bmatrix}; \quad (2.1\,a;b;c)$$

$$T_\gamma = \begin{bmatrix} c\gamma & s\gamma & 0 \\ s\gamma & c\gamma & 0 \\ 0 & 0 & 1 \end{bmatrix}.$$

Applying the rotation in this order yields the transformation matrix from orbit to reference system $$T_O^R = T_\alpha T_\beta T_\gamma = \begin{bmatrix} c\beta c\gamma & c\beta s\gamma & -s\beta \\ s\alpha s\beta c\gamma - c\alpha s\gamma & s\alpha s\beta s\gamma + c\alpha c\gamma & s\alpha c\beta \\ c\alpha s\beta c\gamma + s\alpha s\gamma & c\alpha s\gamma s\beta - s\alpha c\gamma & c\alpha c\beta \end{bmatrix} \quad (2.2)$$

with column vectors $$T_O^R = [t_1\ t_2\ t_3] \quad (2.3)$$

Transformation from reference system to body system. The satellite is deviated from its reference attitude by the Euler-angles $\underline{\Phi} = [\phi\ \Theta\ \psi]^T$, which the controller tries to suppress in the presence of disturbances. For small Euler-angles the transformation matrix from reference system to body system can be linearized to give $$T_R^B = E - \tilde{\underline{\Phi}} \quad (2.4)$$

Kinematics

The dynamic behaviour of the spacecraft has to be described in terms of Euler-angles. Therefore, the body angular velocity and the body angular acceleration appearing in the angular momentum equation need to be expressed by the Euler-angles. The absolute body angular velocity of the spacecraft $\underline{\omega}$ expressed in body system can be split into three parts:

$$\underline{\omega} = \underline{\omega}_O + \underline{\omega}_R + \dot{\underline{\Phi}}, \quad (2.5)$$

where $\underline{\omega}_0$ is the orbit angular velocity of the orbit system relative to the inertial system, $\underline{\omega}_R$ is the reference angular velocity of the reference system relative to the orbit system and $\underline{\omega}$ describes the body angular velocity relative to the reference system.

Orbit angular velocity $\underline{\Phi}_0$. The orbit angular velocity expressed in the reference system is $\underline{\omega}_0{}^R = [0 -\omega_0 0]^T$ and can be expressed in the body system applying two subsequent transformations:

$$\underline{\omega}_0 = T_R{}^B T_O{}^R \underline{\omega}_0{}^R = -(E - \tilde{\underline{\Phi}}) t_2 \omega_0. \qquad (2.6)$$

Reference angular velocity $\underline{\omega}_R$. Defining the vectors $$\underline{\alpha} = \begin{bmatrix} \alpha \\ 0 \\ 0 \end{bmatrix}; \underline{\beta} = \begin{bmatrix} 0 \\ \beta \\ 0 \end{bmatrix}; \underline{\gamma} = \begin{bmatrix} 0 \\ 0 \\ \gamma \end{bmatrix}, \qquad (2.7\text{a; b; c})$$

$\underline{\omega}_R$ can be written as $$\underline{\omega}_R = T_R{}^B \underline{\omega}_R{}^R = [E \tilde{\underline{\Phi}}] \underline{\omega}_R{}^R \qquad (2.8)$$

with $$\underline{\omega}_R{}^R = \dot{\underline{\alpha}} + T_\alpha \dot{\underline{\beta}} + T_\alpha T_\beta \dot{\underline{\gamma}} \qquad (2.9)$$

Expressing the Euler Equation in Terms of Measured Roll and Pitch Angles

The well known Euler equation describing the behaviour of a rigid body tumbling alone in space [J. Wittenburg, Dynamics of Systems of Rigid Bodies. Teubner Verlag, Stuttgart, 1977] is $$I\dot{\underline{\omega}} + \tilde{\underline{\omega}} I \underline{\omega} + \tilde{\underline{\omega}} \underline{h} = -\dot{\underline{h}} + \underline{T}_C + \underline{T}_D, \qquad (2.10)$$

where the variables in eq. (2.9) have the following meaning:

I—inertia matrix w.r.t. principle axes
$\underline{h}$—angular momentum of wheels
$\underline{T}_C$—external control torque
$\underline{T}_D$—external disturbance torque.

Hereinbelow a control law is developed which linearizes the Euler equation. However, it is assumed, that only roll- and pitch-angles are known by measurement. Because these signals will be used for the control law the Euler equation (2.10) is rewritten in terms of the new measurement vector $\underline{\Phi}_M = [\phi \Theta 0]^T$. Therefore, the spacecraft angular velocity vector $\underline{\omega}$ in eq. (2.5) is only partially known and it is replaced by $\underline{\omega}_M$.

$$\underline{\omega}_M = \underline{\omega}_{DM} + \underline{\omega}_{RM} + \dot{\underline{\Phi}}_M \qquad (2.11)$$

The measured part of the orbit angular velocity $\underline{\omega}_{DM}$ is obtained by replacing $\underline{\Phi}$ in eq. (2.6) by $\underline{\Phi}_M$:

$$\underline{\omega}_{DM} = -(E - \tilde{\underline{\Phi}}_M) t_2 \omega_0. \qquad (2.12)$$

Defining the vector $\underline{\psi} = [0 \ 0 \ \psi]^T$, adding of $$\Delta \underline{\omega}_0 = \tilde{\underline{\psi}} t_2 \omega_0 \qquad (2.13)$$

recovers $\underline{\omega}_0$. Similarly, $\underline{\omega}_{RM}$ is obtained by replacing $\underline{\Phi}$ in eq. (2.8) by $\underline{\Phi}_M$.

$$\underline{\omega}_{RM} = (E - \tilde{\underline{\omega}}_M) \underline{\omega}_R{}^R, \qquad (2.14)$$

and adding of $$\Delta \underline{\omega}_R = -\tilde{\underline{\psi}} \ \underline{\omega}_R{}^R \qquad (2.15)$$

recovers $\underline{\omega}_R$.

The spacecraft angular velocity vector $\underline{\omega}$ can be written as $$\underline{\omega} = \underline{\omega}_M + \Delta \underline{\omega} \qquad (2.16)$$

with $$\Delta \underline{\omega} = \dot{\underline{\psi}} + \Delta \underline{\omega}_0 + \Delta \underline{\omega}_R \qquad (2.17)$$

yielding the spacecraft angular acceleration $$\dot{\underline{\omega}} = \dot{\underline{\omega}}_M + \Delta \dot{\underline{\omega}} \qquad (2.18)$$

The measured spacecraft angular acceleration $\dot{\underline{\omega}}_M$ is further split into $$\dot{\underline{\omega}}_M = \dot{\underline{\omega}}_{CM} + \tilde{\underline{\Phi}}_M \qquad (2.19)$$

with $$\dot{\underline{\omega}}_{CM} = \dot{\underline{\omega}}_{CM} + \dot{\underline{\omega}}_{RM}, \qquad (2.20)$$

because the signal $\dot{\underline{\omega}}_{CM}$ rather than $\dot{\underline{\omega}}_M$ is decoupled in order to leave terms of $\phi$ and $\theta$ in the system equation. Before eqs. (2.16, 2.18, 2.19) are inserted into Euler equation (2.10), the second term in eq. (2.10) is simplified: Inserting eq. (2.16) in this term gives $$\tilde{\omega} I \omega = (\tilde{\omega}_M + \Delta \tilde{\omega}_M) I (\omega_M + \Delta \omega_M) \qquad (2.21)$$

$$= \tilde{\omega}_M I \tilde{\omega}_M + (\tilde{\omega}_M I - \widetilde{I \omega_M}) \Delta \omega.$$

Inserting eqs. (2.16, 2.18, 2.19, 2.21) in eq. (2.10) gives after rearranging terms $$I\dot{\omega}_{CM} + \tilde{\omega}_M I \omega_M + \tilde{\omega}_M h + I\tilde{\omega}_M + I\Delta\dot{\omega} + [\tilde{\omega}_M I - \widetilde{I\omega_M} - \tilde{h}] \Delta \omega = \qquad (2.22)$$
$$-\dot{h} + T_C + T_D.$$

Decoupling and Tracking Control

Herein a wheel control torque is developed to satisfy two design objects: First, to decouple yaw-dynamic from roll- and pitch-dynamic and second, to enable tracking of arbitrary bias angles $\alpha(t)$, $\beta(t)$ and $\gamma(t)$. The wheel torque is decomposed in $$\dot{\underline{h}} = \dot{\underline{h}}_D \dot{\underline{h}}_C, \qquad (3.1)$$

where $\underline{h}_D$ is the decoupling and $\underline{h}_C$ is the tracking control part.

Decoupling Control Law

In the reformulated Euler equation (2.22) the measurable terms except the term "$I\tilde{\Phi}_M$" are put into $-\underline{h}_D$, i.e.

$$-\underline{\dot{h}}_D = \underline{\dot{h}}_{CM} + \tilde{\underline{\omega}}_M I \underline{\omega}_M + \tilde{\underline{\omega}}_M \underline{h}. \tag{3.2}$$

Inserting eq. (3.2) in eq. (2.22) results in the decoupled system equation $$I\underline{\dot{\omega}} + \left[\tilde{\underline{\omega}}_M I - I\tilde{\underline{\omega}}_M - \tilde{\underline{h}} - I\tilde{t}_2\omega_0 + I\tilde{\omega}_R^R\right]\underline{\dot{\psi}} + \tag{3.3}$$

$$\left[\left(\tilde{\underline{\omega}}_M I - I\tilde{\underline{\omega}}_M - \tilde{\underline{h}}\right)(-\tilde{t}_2\omega_0 + \tilde{\omega}_R^R) - I\tilde{t}\omega_0 + I\tilde{\omega}_R^R\right]\underline{\psi} =$$

$$-\underline{\dot{h}}_C + T_C + T_D.$$

Because of eq. (2.19) the matrices in brackets in eq. (3.3) still contain Euler-angles $\phi$ and $\theta$. Here, they can be neglected, because they are subsequently multiplied with $\dot{\psi}$ and $\psi$, respectively, resulting in "small" products which can be neglected. It remains only a one-way-directed coupling between roll/pitch-dynamics and roll-dynamics: yaw couples in roll/pitch but not vice versa.

Tracking Control and Yaw Estimation

Equation (3.3) that describes the already partially decoupled plant dynamics with respect to the reference attitude will now be divided into two subsystems according to the roll/pitch motion and the yaw motion. Remembering that the first two components of $\underline{\psi}$ are zero, eq. (3.3) can formally be rewritten as $$\begin{pmatrix} \ddot{\tilde{\phi}} \\ \ddot{\tilde{\theta}} \end{pmatrix} + \underline{c}_1(t)\dot{\psi} + \underline{d}_1(t)\psi = -\underline{\dot{h}}_{c1}^* + \underline{T}_{c1}^* + \underline{T}_{d1}^* \tag{3.4}$$

$$\ddot{\psi} + c_2(t)\dot{\psi} + \underline{d}_2(t)\psi = -\dot{h}_{c2}^* + T_{c2}^* + T_{d2}^* \tag{3.5}$$

$$\psi + c_2(t)\dot{\psi} + d_2(t)\psi = -\dot{h}_{c2}^* + T_{c2}^* + T_{d2}^* \tag{3.5}$$

where $\underline{c}_1(t)$, $\underline{d}_1(t)$ are (2×1) vectors, $c_2(t)$, $d_2(t)$ are scalars; the "*"-superscript indicates, that the torques on the right side of eqs. (3.4, 3.5) are normalized with respect to the diagonal elements of I. For a property established bias momentum along the orbit normal, evaluation of these coefficients shows the following properties:

(i.) $d_2(t)$ and $|\underline{c}_1(t)|$ have a dominating bias. This means that at least one component of $\underline{c}_1(t)$ is relatively large. Comparison: For an Earth pointing geostationary satellite is $\underline{c}_1=[h_y 0]^T$ and $d_2=\omega_o h_y$.

(ii.) $|\underline{d}_1(t)|$ is relatively small. For the geostationary case is $d_1=[0\ 0\ ]^T$.

(iii.) $c_2(t)=0$. This reflects the fact that a bias momentum satellite is a gyroscopic system, i.e. there is no dissipative damping.

Eqs. (3.4, 3.5) demonstrate that yaw-dynamic couples in roll/pitch-dynamic but not vice versa.

Axis related controllers. The roll/pitch subsystem is controlled by a standard PID control law $$-\underline{\dot{h}}_{c1} = -K_P\begin{pmatrix}\phi\\\theta\end{pmatrix} - K_D\begin{pmatrix}\dot{\phi}\\\dot{\theta}\end{pmatrix} - K_I\int\begin{pmatrix}\phi\\\theta\end{pmatrix}dt \tag{3.6}$$

using the measurements of the Earth sensor. Roll and pitch angle derivatives are obtained by numerical differentiation (filtering). $K_P$, $K_D$, $K_I$ are diagonal (2×2) gain matrices. Remember that $\phi$ and $\theta$ are the deviations from the time varying reference attitude system.

The yaw-axis is controlled by a PD control law $$-\dot{h}_{c2} = -k_P\psi - k_D\dot{\psi} \tag{3.7}$$

where $k_D$, $k_P$ are scalar gains and $\psi$, $\dot{\psi}$ are estimates of the yaw state w.r.t. the reference yaw attitude. They are provided by the yaw observer which is discussed subsequently.

Yaw observer. Basically, the yaw state estimates are obtained by a reduced order observer. Although there are standard design procedures—at least for time invariant systems—the subsequent explanations are based on an "engineering approach" rather than a strict mathematical approach, because it considers a feel for the physics of bias momentum satellites and it is very similar for both cases, time-varying and -invariant reference attitude.

For simplicity $\underline{T}_C$, $\underline{T}_D$, and $K_I$ are assumed to be zero for the time being. With properties (i.), (ii.), and eq. (3.6), eq. (3.4) can be rewritten as $$\underline{c}_1(t)\dot{\psi} = -\left(\begin{pmatrix}\ddot{\phi}\\\ddot{\theta}\end{pmatrix} + K_D\begin{pmatrix}\dot{\phi}\\\dot{\theta}\end{pmatrix} + K_P\begin{pmatrix}\phi\\\theta\end{pmatrix}\right). \tag{3.8}$$

Then Laplace transformation of eq. (3.8) for a particular time instant $t_0$ yields $$\begin{pmatrix}\phi\\\theta\end{pmatrix} = -(Es^2 + K_Ds + K_P)^{-1}\underline{c}_1(t_0)\dot{\psi}, \tag{3.9}$$

i.e. ($\phi\theta$) can be regarded as a (delayed) measurement of $\dot{\psi}$, scaled by $\underline{c}_1(t)$. In order to obtain a pseudo-measurement $\dot{\psi}_m$, eq. (3.9) is multiplied by a vector $\underline{w}=[w_1\ w_2]^T$ leading to $$\dot{\psi}_m = \underline{w}^T\begin{pmatrix}\phi\\\theta\end{pmatrix} \tag{3.10}$$

$$= -\underline{w}^T(t_0)(Es^2 + K_Ds + K_P)^{-1}\underline{c}_1(t_0)\dot{\psi}.$$

The vector $\underline{w}$ can be chosen in such a way, that the steady state transfer function in eq. (3.10) from $\dot{\psi}$ to $\dot{\psi}_m$ equals one, i.e.

$$\underline{w} = -\frac{K_P^{-1}\underline{c}_1}{|K_P^{-1}\underline{c}_1|^2}. \tag{3.11}$$

Because of property (i.) and the diagonality-property of $K_P$ the numerator in eq. (3.11) is nonzero, and in all cases a vector $\underline{w}$ can be computed according to eq. (3.11).

Another possibility to generate $\dot{\psi}_m$ is to switch between the first and second row of eqs. (3.9) and (3.10), respectively, depending on the components of $\underline{c}_1$. In this case the corresponding components of $\underline{w}$ have to be zero.

If the second derivative of $[\phi\theta]^T$ in eq. (3.8) is neglected, then even an unfiltered pseudo-measurement $\dot{\psi}_m$ is availabe, because the roll and pitch angles and its derivatives are known. Experience shows, that this is possible for many applications.

Now $\psi_m$ can be used to design a standard observer for the yaw angle $\psi$ based on the plant model eq. (3.5), which is decoupled from the roll/pitch subsystem. Observability can be verified using property (i.).

In case of nonzero external torques $\underline{T}_C$, $\underline{T}_D$, the known contributions can be considered in eq. (3.10), the unknown contributions result in errors of the pseudo-measurement $\psi_m$. For nonzero $K_I$, the integrals of the roll- and pitch angle have to be used for measurement purposes instead of the attitude angles.

Stability Analysis. Due to the periodic variation of the parameters of the plant dynamics (3.4), (3.5), the closed loop stability analysis can be performed by means of Floquet theory. See e.g. M. Vidyasagar, Nonlinear Systems Analysis. Prentice Hall, second edition, 1993.

As already mentioned there is provided a three axis wheel torque capability and a wheel configuration which can establish a wheel angular momentum vector in any desired direction so that also any change of this direction becomes possible. The torque command vector to the wheels is $$\underline{T}_{CW} = -\underline{\dot{h}} = -\underline{\dot{h}}_D - \underline{\dot{h}}_C, \ \underline{\dot{h}}_C = \underline{\dot{h}}_{C1} + \underline{\dot{h}}_{C2}.$$

There is performed a transformation of the open loop spacecraft dynamics given by the Euler equation (2.10) by means of a transformation or decoupling controller. This first feed back control loop leads to a "new spacecraft dynamics" given in equations (3.4) and 3.5) having a two-dimensional part (3.4) coupling the non measurable yaw component $\psi$ to the measurable roll and pitch components $\phi$ and $\theta$, respectively.

The transformation controller generates a first torque command or control signal (3.2) $-\underline{\dot{h}}_D = \underline{T}_{CWD}$ for the wheels and uses as inputs the measurable parts $\underline{\omega}_M$ of the spacecraft angular velocity vector $\underline{\omega}$ and $\underline{\omega}_{CM}$ of the spacecraft angular acceleration vector, the measured angular moment vector $\underline{h}$ of the wheels and the inertia matrix I of the spacecraft.

The essential feature of this approach is the artificial decoupling of roll-pitch dynamics from the yaw dynamics but not vice versa, see equations (3.4) and (3.5). Considering that $c_2(t)$ and $d_1(t)$ can be neglected, see (iii), these equations then take the form:

$$\begin{bmatrix}\ddot{\phi}\\\ddot{\theta}\end{bmatrix} + \underline{c}_1(t)\dot{\psi} = -\underline{h}^*_{c1} + \underline{T}^*_{c1} + \underline{T}^*_{d1} \quad (3.12)$$

$$\ddot{\psi} + d_2(t)\psi = -\underline{h}^*_{c2} + \underline{T}^*_{c2} + \underline{T}^*_{d2} \quad (3.13)$$

Due to the fact that $\underline{\Phi}$ can be measured, a standard PID controller is used, see equation (3.6) for roll and pitch control. Equation (3.13) shows that only a feed back D control law $-k_D\psi$ is needed to stabilize the yaw control loop if $d_2(t)>0$. This can be ensured by proper selection of the size of the wheel angular momentum vector. A disadvantage of this approach is that one can only vary the damping of the yaw closed loop. Therefore a PD control law gives the possibility to optimize the yaw control loop w.r.t. damping and bandwidth.

Equation (3.10) shows one of the possibilities to generate a pseudo measurement of the yaw rate $\dot{\psi}_m$. In case that for the yaw closed loop dynamics only D control is sufficient, the control law is given by $$-\dot{h}_{c2} = -K_D\dot{\psi}_m \quad (3.14)$$

In case an improved yaw closed loop performance it needed, a standard observer approach for the yaw axis can be chosen. $\psi_m$ is then input to a time variant Luenenberg type yaw observer, the yaw control law for this approach being $$-\dot{h}_{c2} = -K_D\dot{\hat{\psi}} - K_P\hat{\psi}$$

with the estimated value $\hat{\psi}$ for the yaw variable $\psi$.

The method of the invention can be applied in generalized roll, pitch and yaw tracking on the basis of only two-axis attitude measurements, for example for roll-pitch tracking in the case of inclined orbit operation or for yaw tracking in the case of yaw steering operation.

Figure 6:
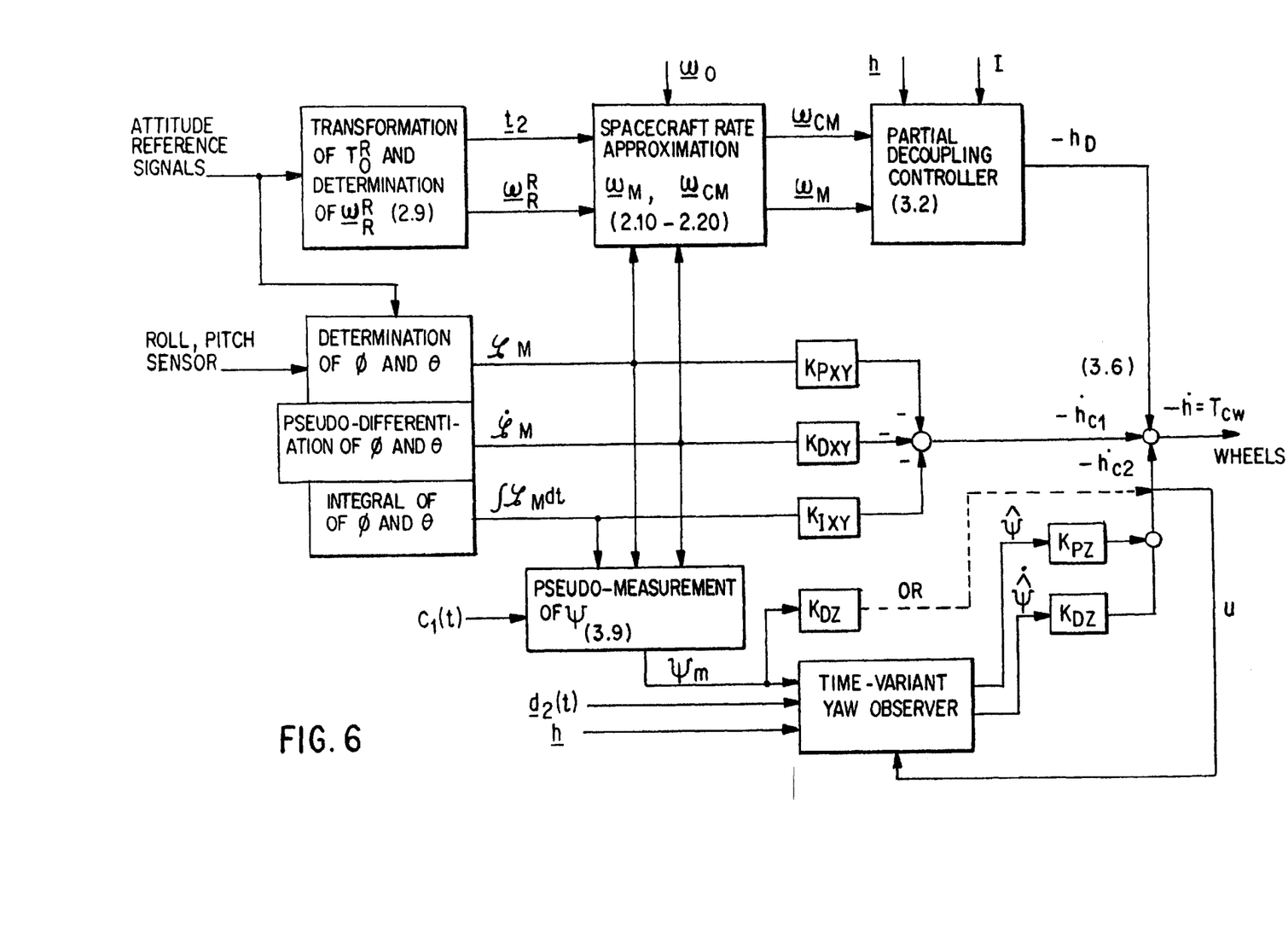
FIG. 6 is a block diagram which illustrates the control process according to the invention.
Figure 7:
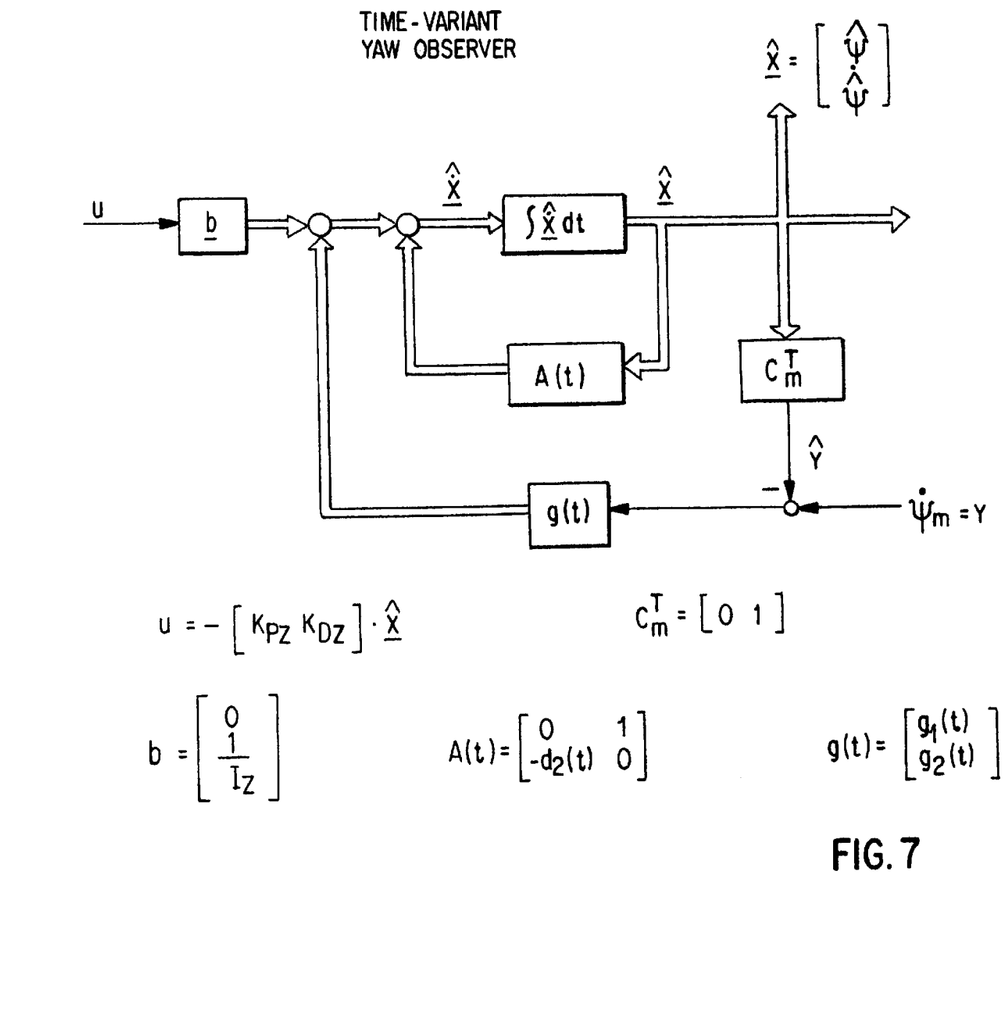
FIG. 7 shows the structure of a yaw observer utilized according to the invention.

In FIG. 6 there is shown a block diagram of the method of the invention, exhibiting the input variables and parameters for the signal processing and control device as well as the output control signal to be fed to the wheel configuration including signal flow within the device and references to the equations to be performed in the device components represented by the respective blocks. FIG. 7 shows the structure of the mentioned yaw observer.

SIMULATION RESULTS

The simulation assumptions and results are taken from M. Surauer, Private communications, 1995.

LEO-application

Some typical applications for LEO-control tasks are Earth pointing (i.e. pitch tracking), roll and yaw tracking. For the simulations the corresponding spacecraft parameters, disturbance torques and orbit parameters are listed below:
Inertia matrix I=diag $\{850, 200, 860\}$ Nms$^2$.
Orbit frequency $\omega_0 = 2\pi/(7200 \text{ s})$.
Disturbance torque $\underline{T}_D = \underline{a}_0 + \underline{a}_1 \cos \omega_0 t + \underline{a}_2 \sin \omega_0 t$
with
$\underline{a}_0^T = [4\ 20\ 10]\ 10^{-6}$ Nm
$\underline{a}_1^T = [-15\ 10\ 0]\ 10^{-6}$ Nm
$\underline{a}_2^T = [0\ 10\ 15]\ 10^{-6}$ Nm
Reference angular momentum $h_y^R = -12$ Nms.
IRES noise: $3\sigma = 0.1$ degree.

Angular momentum control is performed taking magneto torquers to generate external control torques. An example for a roll-tracking maneuver is shown in FIGS. 4.1, 4.2, 4.3. FIG. 4.1 shows the roll-reference $\alpha$ and the controlled roll attitude $\phi$. With this ordinate scaling no difference between the two signals can be noticed.

In FIG. 4.2 the time history of attitude control errors in roll, pitch, and yaw is plotted. FIG. 4.3 shows the wheel angular momentum during the roll-tracking maneuver.

GEO-application

Figure 5:
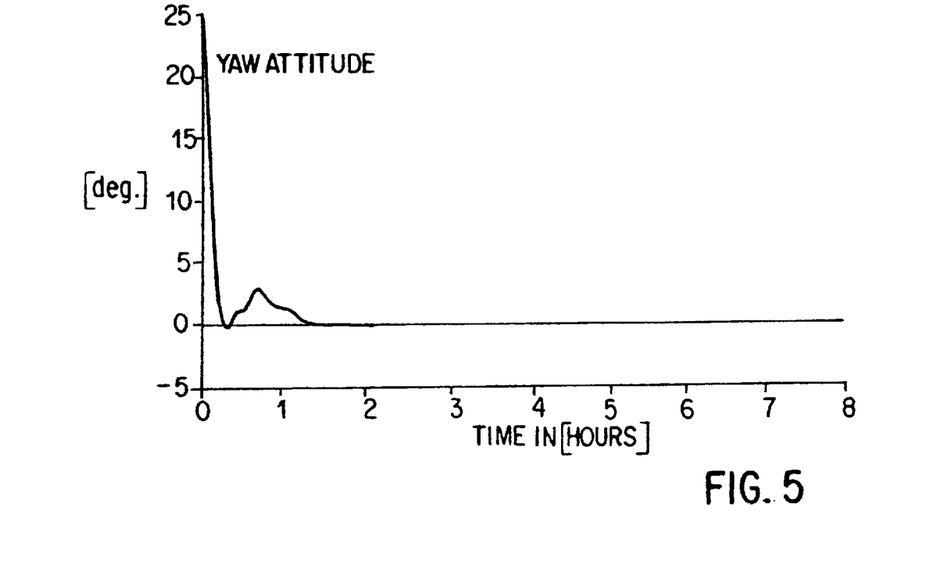
FIG. 5 shows the yaw transient behavior of a geostationary satellite as a function of time.

In order to demonstrate the benefits of the yaw observer derived in section 3.2 the transient behaviour of a GEO satellite with large initial yaw angle ($\psi_0 = 25$ deg.) is considered. No disturbance torque is assumed. The orbit frequency is now $\omega_0 = 2\pi/(24\ h)$, the remaining data are the same as in section 4.1. The time history of $\psi$ is shown in FIG. 5.

Steady state conditions are reached after 2 hours, whereas a whecon controller needs 6 hours to reach steady state.

CONCLUSIONS

A control law for Earth oriented momentum bias satellites with time varying attitude reference signals was derived. Such reference signals have to be applied e.g. for roll tracking maneuvers. The corresponding minimum hardware configuration consists basically of a 2-axis Earth sensor, and wheels that provide a linear torque capability around all 3 spacecraft axes.

The control laws consists of a nonlinear decoupling part that leads to a linear, but time-varying plant dynamics, and axis related PID controllers for the control with respect to the reference attitude. The yaw state estimates are provided by an observer for the time-varying plant.

This approach has the advantage that it can be applied to a more general class of normal mode operations. It also results in an improved transient behaviour for nonzero initial conditions, without serious degradation of the disturbance rejection properties. This was demonstrated by simulation time histories for a classical geostationary satellite in an equatorial orbit revealing fast transient behaviour and for a satellite in LEO performing roll tracking maneuvers.

The forgoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Method for controlling attitude of a three-axis-stabilized, earth oriented bias momentum spacecraft being suppled on its orbit with time varying attitude reference signals with respect to an orbital earth pointing reference coordinate system, and having measurement means for two-axis attitude measurement and a set of wheels for establishing an angular momentum in any desired direction and for producing torques about three axes of a spacecraft-related orthogonal coordinate system, the method comprising:

feeding to a signal processing and control device said time varying attitude reference signals, measurement signals from said measurement means and signals representing an angular momentum vector of said set of wheels;

said signal processing and control device generating first, second and third control signals;

using the sum of said first, second and third control signals as a torque command signal for said set of wheels;

for the generation of said first control signal;

starting from an Euler equation describing dynamics of the spacecraft, transforming the Euler equation by introducing measurable parts $\omega_M$ and $\dot{\omega}_M$ of a spacecraft angular velocity vector $\underline{\omega}$ and its derivative $\underline{\dot{\omega}}$, respectively as derived from $\underline{\Phi}_M \equiv [\phi \Theta 0]^T$, a measurable part of vector $\Phi \equiv [\phi \Theta \psi]^T$ representing deviation of the spacecraft from its reference attitude; and determining said first control signal as one part of the torque vector figuring in the Euler equation, being related to said set of wheels in such a way that said one part compensates all relevant terms in the Euler equation that are measurable by means of said measurement means except for the term $I \underline{\ddot{\Phi}}$, wherein I is the spacecraft inertia matrix;

determining a sum of said second and third control signals as a second part of said torque vector;

said second control signal being generated by one of a PID and a PD control law, using measurable components $\phi$, $\Theta$ of vector $\underline{\Phi}$ as control input; and said third control signal being generated by one of a D control law using the computed derivative $\dot{\psi}$ as controller input and a PD control law using the computed $\dot{\psi}$ as input for a time varying observer; and the estimated observer state variables as controller input.

2. Method for controlling attitude of a three-axis stabilized, earth oriented bias momentum spacecraft being supplied on its orbit with time varying attitude reference signals with respect to an orbital earth pointing reference coordinate system, and having measurement means for two-axis attitude measurement and a set of wheels for establishing an angular momentum in any desired direction and for producing torques about three axes of a spacecraft-related orthogonal coordinate system, the method comprising:

feeding to a signal processing and control device said time varying attitude reference signals, measurement signals from said measurement means and signals representing the angular momentum vector of said set of wheels;

said signal processing and control device generating first, second and third control signals;

using the sum of said first, second and third control signals as a torque command signal for said set of wheels;

said first control signal being determined as a relevant part of a sum of terms being previously obtainable from a transformation of an Euler equation which describes dynamics of the spacecraft, the transformation comprising:

replacing the vectors $\underline{\omega}$ and $\underline{\dot{\omega}}$ representing the spacecraft angular velocity and its time derivative, respectively, by vector sums $(\underline{\omega}_M + \Delta \underline{\omega})$ and $(\underline{\dot{\omega}}_M + \Delta \underline{\dot{\omega}})$, respectively, containing parts $\underline{\omega}_M$ and $\underline{\dot{\omega}}_M$ which are determinable taking into account their dependency upon a two-axial measurement vector $\underline{\Phi}_M \equiv [\phi \Theta 0]^T$, being the measurable part of vector $\Phi \equiv [\phi \Theta \psi]^T$ representing the spacecraft's deviation from its reference attitude, upon the orbit angular velocity $\omega_0$ and upon said time varying reference signals, and parts $\Delta \underline{\omega}$ and $\Delta \underline{\dot{\omega}}$ which are not determinable because of the lacking information in yaw ($\psi$);

said sum of terms comprising all terms of the transformed Euler equation which are determinable in view of said dependency, except for the term $I \underline{\ddot{\Phi}}$, I being a spacecraft inertia matrix;

said second control signal being generated by one of a PID and a PD control law, using measurable components $\phi$, $\Theta$ of vector $\underline{\Phi}$ as control input; and said third control signal being generated by one of a D control law using the computed $\dot{\psi}$ as controller input and a PD control law using the computed $\dot{\psi}$ as input for a time varying observer; and the estimated observer state variables as controller input.

3. Method for controlling attitude of a three-axis-stabilized, earth oriented bias momentum spacecraft being supplied on its orbit with time varying attitude reference signals with respect to an orbital earth pointing reference coordinate system, and having measurement means for two-axis attitude measurement related to deviations in roll and pitch from the time varying reference attitude and a set of wheels for establishing an angular momentum in any desired direction and for producing torques about three axes of a spacecraft-related orthogonal coordinate system, the method comprising:

feeding to a signal processing and control device said time varying attitude reference signals, measurement signals from said measurement means and signals representing an angular momentum vector of said set of wheels;

said signal processing and control device generating first, second and third control signals;

using the sum of said first, second and third control signals as a torque command signal for said set of wheels;

said first control signal being formed in a partial decoupling controller such that yaw dynamics couples into roll and pitch dynamics, but not vice versa;

said second control signal being generated by means of one of a PID and PD control law, using deviations in roll and pitch as control input;

said third control signal being generated by means of one of a D control law using a computed derivative of yaw deviation as controller input, and a PD control law using said computed derivative of the yaw deviation as input for a time varying reduced order observer, and estimated observer state variables as controller input; and said computer derivative of the yaw deviation being determined on the basis of a spacecraft dynamics subsystem related to roll-pitch-motion, taking into account control of the subsystem by said second control signal.

* * * * *